US008660099B2

(12) United States Patent
Iyer et al.

(10) Patent No.: US 8,660,099 B2
(45) Date of Patent: Feb. 25, 2014

(54) CALL ADMISSION CONTROL WITHIN A WIRELESS NETWORK

(75) Inventors: Pradeep J Iyer, Cupertino, CA (US); John Richard Taylor, Tiburon, CA (US); Deepinder Setia, San Ramon, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 312 days.

(21) Appl. No.: 11/635,846

(22) Filed: Dec. 7, 2006

(65) Prior Publication Data

US 2007/0076612 A1 Apr. 5, 2007

Related U.S. Application Data

(63) Continuation-in-part of application No. 11/241,480, filed on Sep. 30, 2005, now Pat. No. 7,756,126.

(51) Int. Cl.
*H04W 4/00* (2009.01)

(52) U.S. Cl.
USPC .......... 370/338; 370/331; 455/41.2; 455/444; 455/452.2; 455/453

(58) Field of Classification Search
USPC ............... 455/436–444, 448, 450–453, 41.2, 455/432.1; 370/331–338, 230, 237
See application file for complete search history.

(56) References Cited

U.S. PATENT DOCUMENTS

| | | | |
|---|---|---|---|
| 5,892,912 A * | 4/1999 | Suzuki et al. ............ 370/395.53 |
| 6,104,696 A | 8/2000 | Kadambi et al. |
| 6,563,832 B1 | 5/2003 | Stuart et al. |
| 6,643,261 B2 | 11/2003 | Kadambi et al. |
| 6,987,729 B1 * | 1/2006 | Gopalakrishnan et al. ... 370/230 |
| 7,095,738 B1 | 8/2006 | Desanti |
| 7,283,823 B2 * | 10/2007 | Pearce et al. ................... 455/439 |
| 7,324,543 B2 * | 1/2008 | Wassew et al. ............... 370/437 |
| 7,397,775 B2 * | 7/2008 | Womack et al. .............. 370/328 |
| 7,398,088 B2 * | 7/2008 | Belkin et al. .................. 455/439 |
| 7,437,157 B1 * | 10/2008 | Satapathy .................. 455/435.1 |
| 7,469,146 B2 * | 12/2008 | Soong et al. .................. 455/453 |
| 7,512,068 B1 * | 3/2009 | Ghaderi Dehkordi et al. ............................ 370/230 |
| 7,539,492 B2 * | 5/2009 | Jagadeesan et al. .......... 455/436 |
| 7,756,126 B2 | 7/2010 | Iyer et al. ...................... 370/389 |
| 7,774,000 B2 * | 8/2010 | Kezys ........................... 455/453 |
| 7,894,823 B2 * | 2/2011 | Alemany et al. .............. 455/453 |
| 8,238,925 B2 * | 8/2012 | Meier ........................... 455/451 |
| 8,244,258 B2 * | 8/2012 | Hori ............................... 455/445 |
| 8,379,576 B1 * | 2/2013 | Vrzic et al. ................... 370/329 |

(Continued)

OTHER PUBLICATIONS

U.S. Appl. No. 11/241,480, Notice of Allowance and Fee(s) Due, mailed Jan. 27, 2010.

(Continued)

*Primary Examiner* — Sharad Rampuria
(74) *Attorney, Agent, or Firm* — Varun A. Shah

(57) ABSTRACT

An association request from a wireless station is received at an access point. A determination is made whether a reservation threshold for a pre-determined number of wireless stations for the access point has been met. If the reservation threshold has not been met, the wireless station is associated with the access point. If the reservation threshold has been met, and the wireless station is not already on a call through another access point, the association of the wireless station with the access point is rejected.

18 Claims, 8 Drawing Sheets

(56) References Cited

U.S. PATENT DOCUMENTS

| | | |
|---|---|---|
| 2003/0035398 A1 | 2/2003 | Sato |
| 2003/0134642 A1* | 7/2003 | Kostic et al. .................. 455/450 |
| 2003/0148765 A1* | 8/2003 | Ma et al. ........................ 455/438 |
| 2004/0053624 A1* | 3/2004 | Frank et al. .................... 455/453 |
| 2004/0229621 A1* | 11/2004 | Misra ............................. 455/445 |
| 2006/0009232 A1* | 1/2006 | Vakil et al. .................... 455/453 |
| 2006/0083193 A1* | 4/2006 | Womack et al. ............... 370/328 |
| 2010/0279704 A1* | 11/2010 | Vachhani ....................... 455/453 |

OTHER PUBLICATIONS

U.S. Appl. No. 11/241,480, Office Action, mailed Jul. 6, 2009.
U.S. Appl. No. 11/241,480, Final Rejection Action, mailed Jan. 14, 2009.
U.S. Appl. No. 11/241,480, Office Action, mailed Jul. 30, 2008.

\* cited by examiner

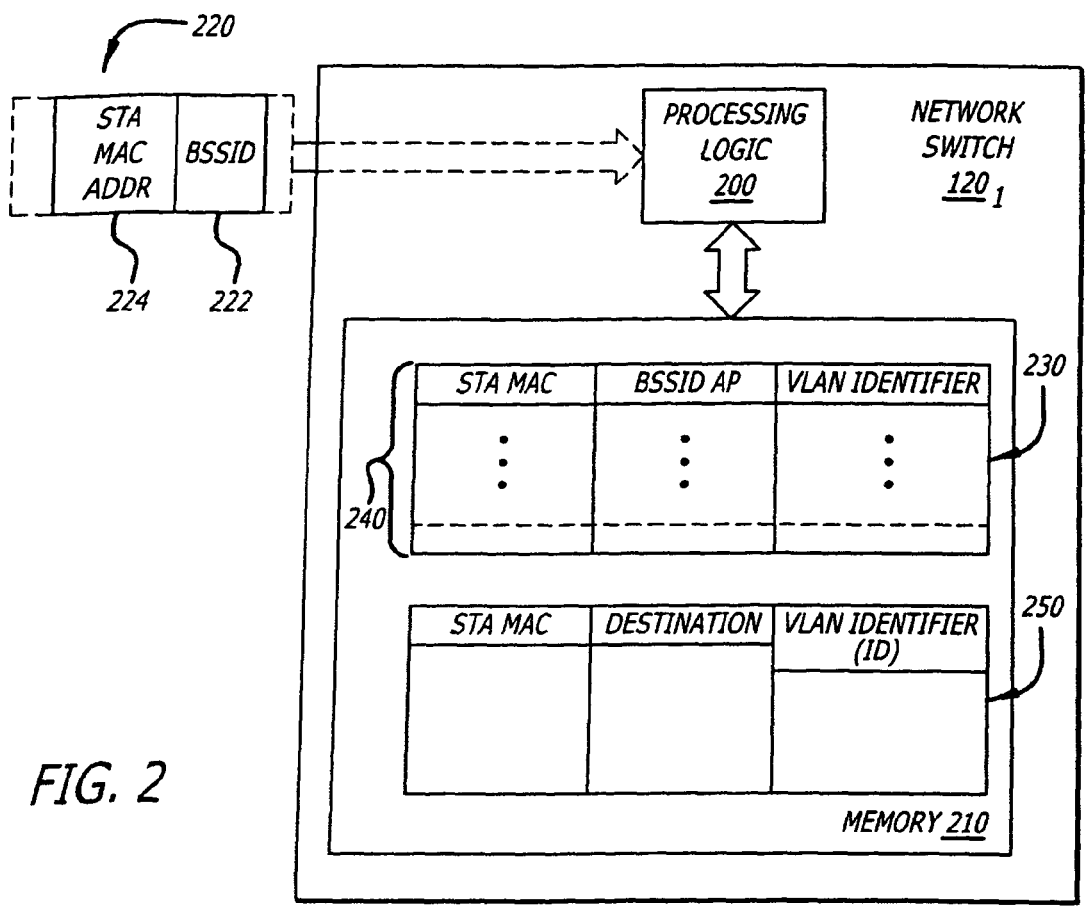

| STA MAC ADDRESS | BSSID (AP) | VLAN IDENTIFIER |
|---|---|---|
| MAC ADDRESS OF STA $150_1$ | BSSID OF AP $130_1$ | VLAN ID (X021) |
| MAC ADDRESS OF STA $150_2$ | BSSID OF AP $130_1$ | VLAN ID (X021) |
| MAC ADDRESS OF STA $150_3$ | BSSID OF AP $130_1$ | VLAN ID (X021) |
| MAC ADDRESS OF STA $150_4$ | BSSID OF AP $130_2$ | VLAN ID (X021) |
$230_1$
| STA MAC ADDRESS | BSSID (AP) | VLAN IDENTIFIER |
|---|---|---|
| MAC ADDRESS OF STA $150_1$ | BSSID OF AP $130_3$ | VLAN ID (X022) |
| | | |
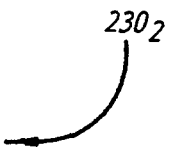
$230_2$
| STA MAC ADDRESS | BSSID (AP) | VLAN IDENTIFIER |
|---|---|---|
| | | |
| | | |
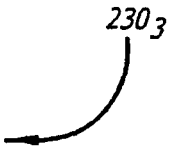
$230_3$
FIG. 3A

CALL ADMISSION CONTROL WITHIN A WIRELESS NETWORK

CROSS-REFERENCE TO RELATED APPLICATIONS

This Application is a Continuation-in-Part of U.S. Ser. No. 11/241,480 filed Sep. 30, 2005.

FIELD

Embodiments of the invention relate to the field of communications, and in particular, to a system, method, and apparatus for call admission control within a wireless network.

GENERAL BACKGROUND

Over the last decade or so, companies have installed enterprise networks with one or more local area networks in order to allow their employees access to various network resources. To improve efficiency, enhancements have been added to local area networks such as wireless access. Based on this enhancement, wireless local area networks (WLANs) have been and continue to be utilized by more and more companies.

Typically, a WLAN supports communications between wireless stations (STAs) and Access Points (APs). In general, each AP operates as a relay station by supporting communications with other network devices, such as wireless stations and other APs being part of a wireless network, as well as with resources on a wired network.

Currently, sub-networks (referred to as "subnets") are created in order to direct broadcast and multicast transmissions from an AP to smaller groups of wireless stations. One well-established network configuration used by WLAN is referred to as "/24," where approximately 250 network devices can be grouped as part of the same virtual local area network (VLAN). In general, a "VLAN" is a logical subgroup within a local area network (e.g., WLAN) that is created via software rather than manually moving cables in the wiring closet. VLANs combine network devices, such as a plurality of wireless stations (STAs) for example, into a single collective group regardless of their physical LAN connectivity.

Normally, STAs are assigned to certain VLANs based on their association with a particular AP. While this may be acceptable for a wired network where the stations are stationary, it is unacceptable for wireless stations that are adapted to roam (i.e., change their physical location). Currently, when a wireless station roams and establishes communications with another AP, it may be required to establish a new Internet Protocol (IP) address, especially if the new AP would be part of a different IP subnet. In addition, based on this new association, the wireless station may be assigned to a different VLAN. These operations cause network inefficiencies and may be disruptive to the operations of the wireless station.

Additionally, in current wireless network architectures, an access point will typically continue to keep adding wireless stations that request an association with the network for a voice call regardless of the number of wireless stations currently being serviced by the access point and the amount of call traffic being handled by the access point. This often results in serious call quality degradation.

BRIEF DESCRIPTION OF THE DRAWINGS

The invention may best be understood by referring to the following description and accompanying drawings that are used to illustrate embodiments of the invention.

FIG. 2 is an exemplary embodiment of one of the network switches illustrated in FIG. 1.

FIG. 3A is an exemplary embodiment of the format of Association listings supported by the network switches of FIG. 1.

FIG. 3B is an exemplary embodiment of the format of a Bridge listing supported by the network switches of FIG. 1.

DETAILED DESCRIPTION

Figure 1:
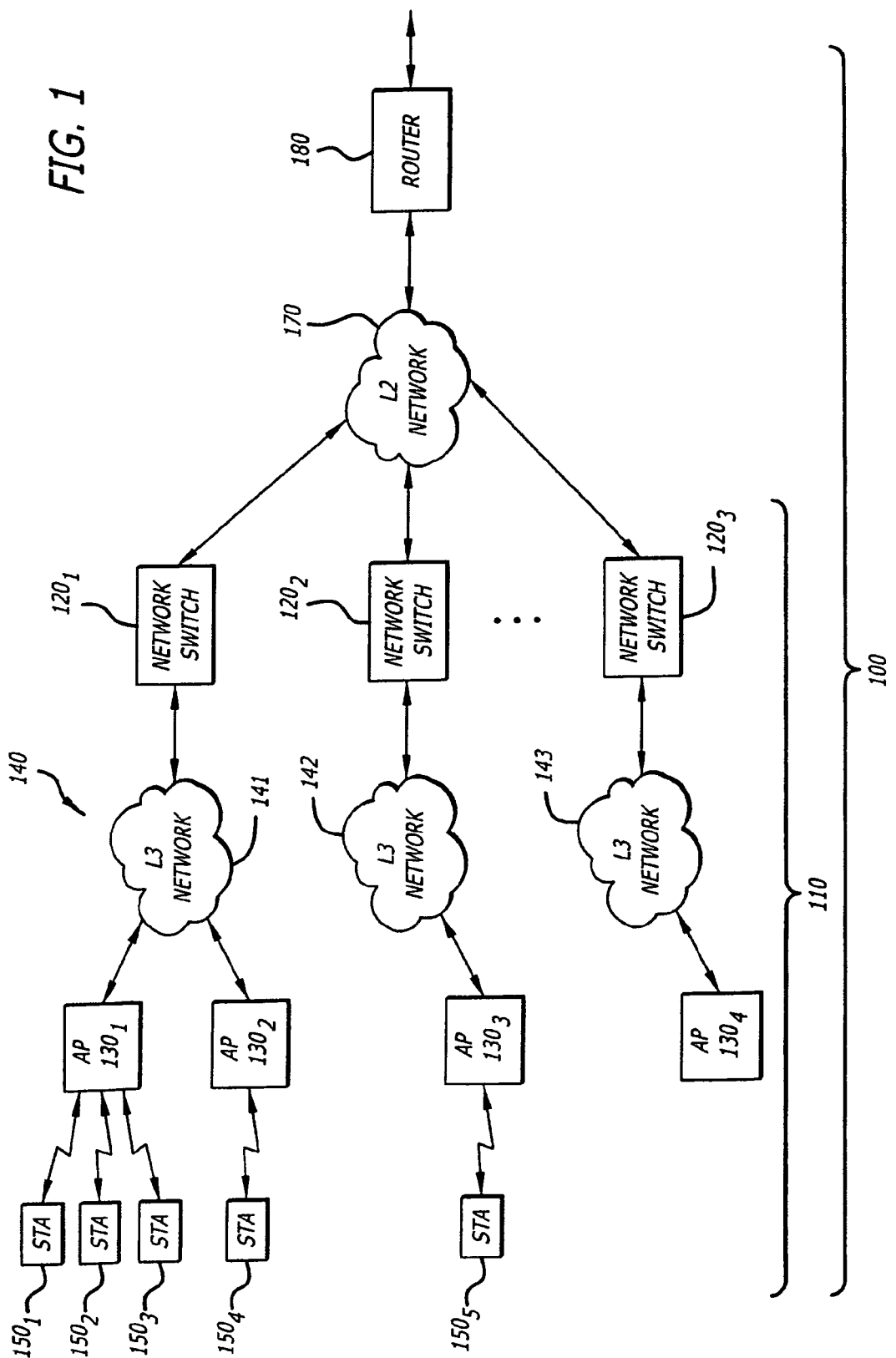
FIG. 1 is an exemplary embodiment of a network including network switches operating in accordance with an embodiment of the invention.

Embodiments of the invention relate to a system and apparatus for supporting and maintaining virtual local area networks (VLAN) without tunneling or other special communication protocols. According to one embodiment of the invention, a network switch is adapted with memory for storage of an Association listing and a Bridge listing. The "Association listing" is a collection of media access control (MAC) addresses of stations that are in communication with the network switch over an Access Point (AP) and their corresponding VLAN. The "Bridge listing" is a collection of the MAC addresses for all stations and their corresponding VLANs for the network. The size and aging of the Bridge listing is configured to provide infrequent overwriting of its entries.

Embodiments of the invention further relate to a method, network switch, and system for communication within a wireless network to implement call admission control. To illustrate this embodiment, an association request from a wireless station is received at an access point. A network switch determines whether a reservation threshold for a predetermined number of wireless stations for the access point has been met. If the reservation threshold has not been met, the network switch associates the wireless station with the access point and further updates the association listing and bridge listing. If the reservation threshold has been met, and the wireless station is not already on a call through another access point, the association of the wireless station with the access point is rejected by the network switch. Other embodiments related to call admission control will also be hereinafter described.

Herein, according to one embodiment, the invention may be applicable to a network adapted with a wireless network such as a wireless local area network (WLAN) or wireless personal area network (WPAN). The wireless network may be configured in accordance with any current or future wireless communication protocols. Examples of various types of wireless communication protocols include, but are not limited or restricted to the following: Institute of Electrical and Electronics Engineers (IEEE) 802.11 standards, High Performance Radio Local Area Networks (HiperLAN) standards, WiMax (IEEE 802.16) and the like. For instance, the IEEE 802.11 standard may an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999); an IEEE 802.11a standard entitled "Wireless LAN Medium Access Control (MAC) and Physical Layer (PHY) specifications: High-Speed Physical Layer in the 5 GHz Band" (IEEE 802.11a, 1999); a revised IEEE 802.11 standard "Wireless LAN Medium Access Control (MAC) and Physical Layer (PHY) specifications" (IEEE 802.11, 1999); an IEEE 802.11g standard entitled "Wireless LAN Medium Access Control (MAC) and Physical Layer (PHY) specifications: Further Higher Data Rate Extension in the 2.4 GHz Band" (IEEE 802.11g, 2003) or the like.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, the terms "logic" and "unit" are generally defined as hardware and/or at least one software module that is configured to perform one or more operations. For instance, processing logic may include a processor, a programmable gate array, combinatorial logic, a controller, or the like. A software module is executable code such as an application, an applet, a routine or even one or more executable instructions. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a tape, a Universal Serial Bus "USB" flash drive), or the like.

An "interconnect" is generally defined as a communication pathway established over an information-carrying medium. The interconnect may be a wired interconnect, where the medium is a physical medium (e.g., electrical wire, optical fiber, cable, bus traces, etc.), a wireless interconnect (e.g., air in combination with wireless signaling technology) or a combination of these technologies.

"Information" is defined as data, address, control or any combination thereof. For transmission, information may be transmitted as a message, namely a collection of bits in a predetermined format. One type of message, namely a wireless message, includes a header and payload data having a predetermined number of bits of information. The wireless message may be placed in a packet, frame or cell format. A "listing" is a collection of information that is used to identify relationships between such information. For instance, a listing may be a table that provides mapping between source MAC addresses and VLAN identifier.

I. General Network Architecture

Referring to FIG. 1, an exemplary embodiment of a network 100 including network switches operating in accordance with an embodiment of the invention is shown. In accordance with this embodiment of the invention, network 100 includes a local area network 110 adapted with an enhancement that allows wireless access, thereby operating as wireless local area network (WLAN) 110.

As shown in detail, WLAN 110 comprises one or more network switches $120_1$-$120_N$ (N≥1), such as WLAN ETHER-NET™ switch(es) for example, in communication with one or more access points (APs) $130_1$-$130_M$ (where M≥1, M=4 for this embodiment) over an interconnect 140. According to one embodiment, interconnect 140 may be one or more subnetworks (subnets) forming an Open System Interconnection (OSI) Layer 3 (L3) network. Examples of these subnets include an Internet Protocol (IP) subnets 141-143. In general, interconnect 140 comprises wired and/or wireless information-carrying medium that provides a communication path between APs $130_1$-$130_M$ and network switches $120_1$-$120_N$.

In addition, one or more wireless stations, identified as STA $150_1$-$150_P$ (where P≥1, P=5 for this embodiment), are in communication with APs $130_1$-$130_M$ over wireless interconnect 160. According to one embodiment, a STA is implemented as any wireless device that processes information (e.g., computer, personal digital assistant "PDA", wireless telephone, alphanumeric pager, etc.). According to one embodiment of the invention, although not shown in detail, the STA may comprise a removable, wireless network interface card (NIC) that is separate from or employed within the STA. Normally, the NIC comprises a wireless transceiver, although it is contemplated that the NIC may feature only receive (RX) or transmit (TX) functionality such that only a receiver or transmitter is implemented.

More specifically, for this embodiment of the invention, each AP $130_1$, $130_2$, $130_3$ or $130_4$ supports bi-directional communications by receiving wireless messages from STAs $150_1$-$150_P$ within its coverage area and transferring information extracted from the wireless messages over interconnect 140 to which network switches $120_1$-$120_N$ are coupled. Hence, STAs $150_1$-$150_P$ are adapted to communicate with and provide information to any associated AP $130_1$, ..., or $130_M$.

For instance, as shown as an illustrative embodiment of a network configuration, STAs $150_1$-$150_3$ may be associated with AP $130_1$ and communicates over the air in accordance with a selected wireless communications protocol. Hence, AP $130_1$, generally operates as a transparent bridge connecting together a wireless and wired network. Similarly, STA $150_4$ may be associated with AP $130_2$ and STA $150_5$ may be associated with AP $130_3$.

Herein, each STA is assigned to a particular VLAN supported by WLAN 110 in order to establish broadcast/multicast domains. This VLAN assignment may be established through any number of mechanisms, including those that assign STAs to VLANs independent of their physical location.

Each network switch $120_1$ ... $120_N$ comprises logic that supports bi-directional communications with assigned APs $130_1$-$130_M$ over interconnect 140. Namely, network switches $120_1$-$120_N$ receives messages from and transmits messages to one or more targeted APs $130_1$, ..., or $130_M$ over interconnect 140. As an example, upon receiving a wireless message, an AP (e.g., AP $130_1$) extracts information and places such information into one or more IP packets for transmission to one of network switches $120_1$-$120_N$. As shown, network switch $120_1$ terminates APs $130_1$, and $130_2$, while network switches $120_2$ and $120_3$ terminate APs $130_3$ and $130_4$, respectively.

Referring still to FIG. 1, network switches $120_1$-$120_N$ are in communication with an OSI Layer 2 (L2) network 170. L2 network 170 enables communications between network switches $120_1$-$120_N$. L2 network 170 is further in communication with a router 180 that enables ends users on a private network (not shown) to communication with wireless stations $150_1$-$150_P$ within WLAN 110.

II. General Configuration of Network Switch and Listings

Referring now to FIG. 2, an exemplary embodiment of a network switch (e.g., network switch $120_1$) illustrated in FIG.

1 is shown. It is contemplated, however, that each network switch may be implemented with the same configuration described below.

Herein, network switch $120_1$, comprises processing logic 200 and memory 210. In response to receipt of an Association Request by AP $130_1$ of FIG. 1 for this illustrative example, information from the Association Request is placed into a message 220 and routed to network switch $120_1$. Such information includes a Basic Service Set Identifier (BSSID) 222 of AP $130_1$ and a media access control (MAC) address of a station (e.g. STA $150_1$) initiating the Association Request (hereinafter referred to as the "STA MAC address" 224).

Processing logic 200 extracts at least STA MAC address 224 and determines if STA MAC address 224 has been previously stored within an Association listing 230 stored in memory 210. According to this embodiment of the invention, Association listing 230 is a table including a plurality of entries 240. Each entry includes at least (1) STA MAC address 242 for a station that has associated with APs terminated by network switch $120_1$ (e.g., AP $130_1$ or AP $130_2$ of FIG. 1), and (2) a VLAN identifier 244 that identifies the VLAN to which the station is assigned.

For a network where STAs $150_1$-$150_3$, $150_4$ and $150_5$ are associated with APs $130_1$, $130_2$ and $130_3$ respectively, Association listings 230 for network switches $120_1$-$120_3$, which are identified herein as Association listings $230_1$-$230_3$, would have the format shown in FIG. 3A.

Referring back to FIG. 2, where processing logic 200 determines that extracted STA MAC address 224 has not been previously stored within Association listing 230, processing logic 200 inserts STA MAC address 224 into a selected entry of Association listing 230 and assigns a VLAN ID 226 to STA $150_1$. As shown in FIG. 3B, STA $150_1$ is assigned to VLAN ID 226 represented as x021.

In addition, as shown in FIG. 3B, STA MAC address 224 and VLAN ID 226 are loaded into an entry of Bridge listing 250 stored in memory 210 of network switch $120_1$. Bridge listing 250 is a table that is populated with information from Bridge listings stored within other network devices in order to maintain a table of the MAC addresses for all stations associated within WLAN 110 of FIG. 1 as well as their corresponding VLAN IDs. As shown, STA MAC address 224 and VLAN ID 226 are further populated into Bridge listings stored in memory associated with other network devices (e.g., network devices $120_2$ and $120_3$). Hence, these Bridge listings would contain the same information as Bridge listing 250. As shown, the content within the destination fields is represented by the label "XXX" since these values are not pertinent to the discussion of the invention.

It is noted that an entry of Bridge listing 250 is created when network switch $120_1$, receives a frame from the STA $150_1$. If this frame is going to a broadcast/multicast address (e.g., an Address Resolution Protocol "ARP" Request), other networks switches need to also "see" the frame. As a result, a unique identifier of STA such as STA MAC address 224, and its corresponding VLAN ID 226 are loaded into entries of Bridge listings for network switches $120_2$ and $120_3$ based on communications supported by L2 network 170 of FIG. 1.

As a result, each network switch includes a first listing of STA MAC addresses and VLAN IDs corresponding to those STAs that are in communication with APs terminated by the network switch, and a second listing that includes the MAC addresses for all stations associated within APs within the WLAN. While the network switches may be responsible for loading and updating of these listings, it is contemplated that a management server may be used to control such operations.

With respect to aging of Association listing 230 and Bridge listing 250, it is contemplated that entries within Association listing 230 are aged out (e.g., available to be overwritten) when the STA associated with the entry disassociates from an AP terminated by the network switch. For instance, an entry associated with STA $150_1$ is aged out when STA $150_1$ disassociated from APs $130_1$ and $130_2$. In contrast, entries within Bridge listing 250 are aged out substantially slower than the age-out time for Association listing 230. For instance, Bridge listing 250 may be configured with to store approximately 64K entries. Hence, Bridge listing 250 will include entries, and in essence maintain the original VLAN assignments for a STA for a long duration and perhaps even indefinitely for smaller-scale networks.

III. Illustrating Embodiment of Listing Formations

Figure 4:
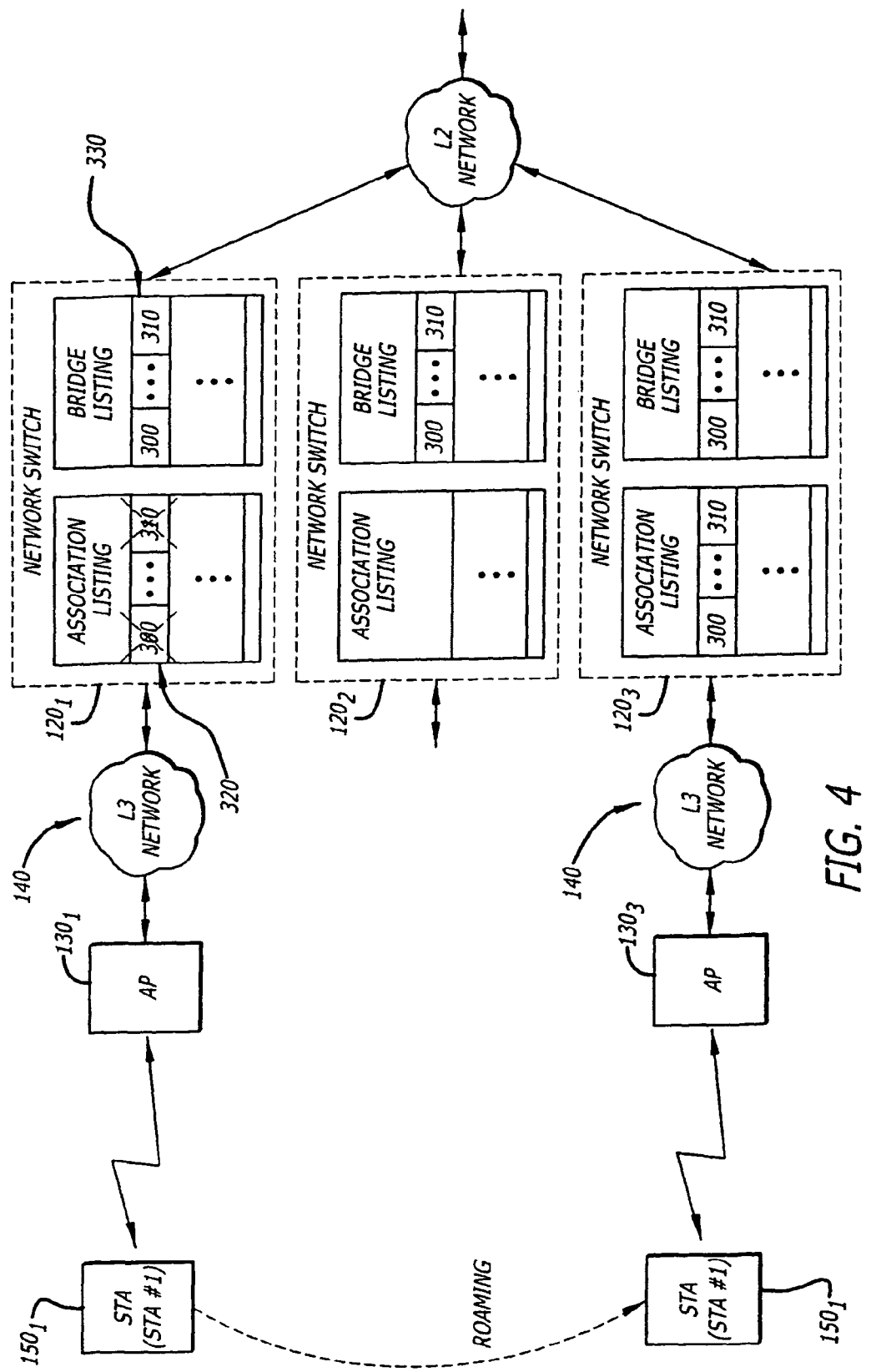
FIG. 4 is an illustrative embodiment of the operations of a network device to formulate its Association and Bridge listings.

Referring to FIG. 4, an illustrative embodiment of the operations of a network device to formulate its Association and Bridge listings are described below. Upon STA $150_1$ associating with AP $130_1$ that is terminated by network switch $120_1$, network device $120_1$, extracts a MAC address of STA $150_1$, namely STA MAC address 300, from the incoming message and determines if STA MAC address 300 has been previously stored within an Association listing $230_1$, stored by network device $120_1$.

Where processing logic 200 determines that extracted STA MAC address 300 has not been previously stored within Association listing $230_1$, Association listing $230_1$, is updated by assigning STA $150_1$ to a selected identifier (e.g., VLAN ID 310) and creating a new entry 320 with STA MAC address 300 and VLAN identifier 310 identifying the selected VLAN.

In addition, a new entry 330 is created within Bridge listing 250 of network device $120_1$. Entry 330 comprises STA MAC address 300 and VLAN identifier 310. In response to creation of a new entry within Bridge listing 250, it is contemplated that Bridge listings for network switch $120_2$ and $120_3$, namely Bridge listings 260 and 270, are populated with information contained in entry 330. As a result, each network switch $120_1$-$120_3$ includes duplicative entries for STA MAC address 300 and VLAN identifier 310 found in Bridge listings 250, 260 and 270. The entries of Bridge listings 250, 260 and 270 are populated as described above.

As a result, in the event that STA $150_1$ now associates with AP $130_3$, in lieu of reassigning VLAN or performing IP-to-IP tunneling, network switch $120_3$ first determines whether information for STA $150_1$ is in Association listing $230_3$ stored therein. Since this involves a new association between STA $150_1$ and AP $130_3$, no corresponding entry would be located in Association listing $230_3$. As a result, Bridge listing 270 is reviewed to determine whether STA MAC address 300 (for STA $150_1$) is contained therein. Since STA $150_1$ was previously associated with AP $130_1$, Bridge listing 270 would feature the entry, and thus, would assign any multicast or broadcast messages from STA $150_1$ to the VLAN associated with VLAN identifier 310.

With respect to aging of the Association and Bridge listings, it is contemplated that entries within an Association listing are aged out (e.g., available to be overwritten) when the station associated with the entry disassociates from an Access Point terminated by the network switch. For instance, entry 320 associated with STA $150_1$ is aged out (represented by cross-out in dashed lines) when STA $150_1$ disassociated from APs $130_1$ and $130_2$. In contrast, entries within Bridge listing 250 are aged out substantially slower than the age-out time frame for Association listing $230_1$, and thus, would contain entry 330 for a substantially longer duration and perhaps even indefinitely for networks with a limited number of newly added stations.

IV. General Operational Flow for VLAN Mobility

Figure 5:
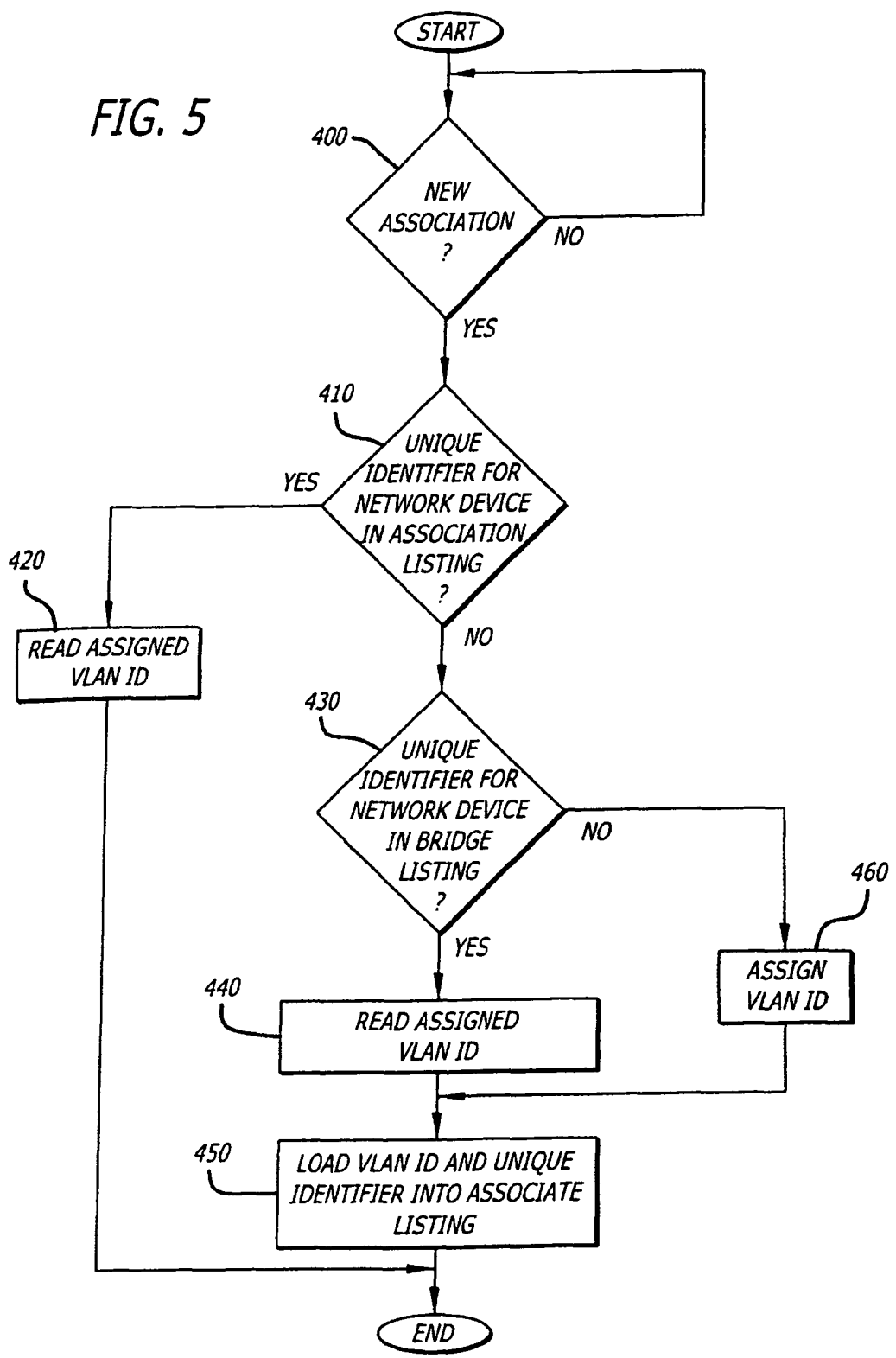
FIG. 5 is an exemplary embodiment of a method of operation for the network switch of FIG. 2 in supporting VLAN mobility.

Referring now to FIG. 5, an exemplary embodiment of a method of operation for the network switch of FIG. 2 in supporting VLAN mobility. Upon determining a new association by a network device, a determination is made whether the Association listing contains a unique identifier for the network device (blocks 400 and 410). The unique identifier may include a MAC address of the network device, such as a STA MAC address. If the Association listing contains a unique identifier for the network device, the VLAN identifier is read and used for multicast or broadcast messages (block 420).

However, if the Association listing does not contain a unique identifier for the network device, a determination is made whether the Bridge listing contains the unique identifier for the network device (block 430). If the Bridge listing contains a unique identifier for the network device, the VLAN identifier is read and used for multicast or broadcast messages (block 440). In addition, the contents of the entry is loaded into the Association listing (block 450). Otherwise, the VLAN identifier is assigned, causing a new entry to be created within the Association listing, the Bridge listing as well as Bridge listings of the other network switches (block 460).

V. Call Admission Control within a Wireless Network

Additional embodiments of the invention relate to call admission control within wireless network 110. In one embodiment, an association request from a wireless station 150 is received at an access point 130. The corresponding network switch 120 may be utilized to determine whether a handoff reservation threshold for a pre-determined number of wireless stations 150 for the access point 130 has been met. If the reservation threshold has not been met, the network switch 120 associates the wireless station 150 with the access point 130 and further updates the association listing 230 and bridge listing 250. If the reservation threshold has been met, and the wireless station 150 is not already on a call through another access point 130, the association of the wireless station 150 with the access point is rejected by the network switch 120.

Figure 6:
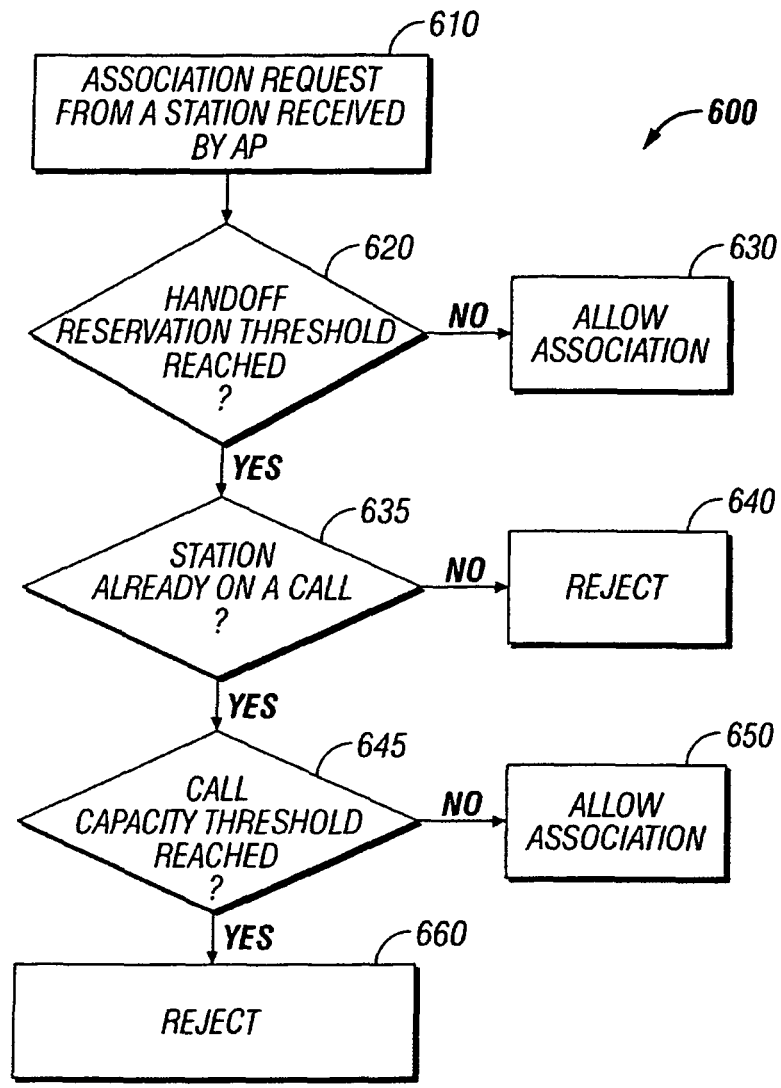
FIG. 6 is an exemplary embodiment of a method of operation for the network switch of FIG. 2 to implement call admission control.

Referring now to FIG. 6, an exemplary embodiment of a method of operation 600 of the network switch 120 of FIG. 2 in supporting call admission control will be described. It should be appreciated that processing logic 200 coupled to the memory 210 of network switch 120 under the control of a program may be utilized to perform the following operations.

At block 610, an association request from a wireless station 150 is received by an access point 130 which is forwarded on to the network switch 120. The network switch 120 determines whether a handoff reservation threshold for a pre-determined number of wireless stations 150 for the access point 130 has been reached (block 620).

If the handoff reservation threshold has not been met, then the network switch 120 associates the wireless station 150 with the access point 130. Further, the network switch updates its association listing 230 and its bridge listing 250 (as well as the other bridge listings in the other network devices of the wireless network 110).

However, if the reservation threshold has been met, at decision block 635, the network switch 120 determines whether the wireless station 150 is already on a call through another access point. This functionality can be accomplished by reviewing the bridge listing 250, as previously described. If the station is not already on a call through another access point, then the request for the association to the access point by the wireless station is rejected (block 640).

On the other hand, if the reservation threshold has been met and the wireless station 150 is already on a call through another access point, the network switch 120 next examines the call capacity threshold. The call capacity threshold corresponds to a pre-determined amount of voice call traffic. Particularly, at decision block 645, if it is determined that the call capacity threshold has not been reached, then the network switch 120 allows the association between the wireless station 150 and the access point 130 and correspondingly updates the association listing 230 and bridge listing 250.

However, if the call capacity threshold has been met, then the request for association by the wireless station 150 to the access point 130 is rejected at block 660.

Further, as previously described, associating the wireless station 150 with the access point 130 typically includes the processing logic 200 performing operations that include the association of a VLAN identifier with the wireless station 150 in both the association listing 230 specific to the network switch 120 and in the bridge listing 250 which is resident both upon the processing network switch 120 and the plurality of other network switches $120_{1-N}$ of the wireless network 110.

Thus, the call admission control system previously described contains multiple thresholds including: a handoff reservation threshold, a determination as to whether the station is already on call, and a call capacity threshold. All of these thresholds may be set by a network administrator. Thus, a network administrator can specify a maximum number of active calls per access point and can further specify the amount of call capacity reserved for voice clients on mobile calls.

In essence, the above methodology allows a network administrator to set a maximum simultaneous amount of voice calls that may be handled by an access point and can balance these calls based upon different thresholds, while not degrading call quality. For example, if a maximum simultaneous amount of calls is set to 10 and the handoff reservation is set to 6, after 6 calls have been associated, voice calls are then load balanced. Further, stations that are already on a call may be favored whereas stations not already on a call may be disfavored and rejected. For example, with the previously described thresholds, new wireless stations that are already on a call through another access point (e.g., call 7, 8, 9 and 10) may be allowed to be associated with the access points whereas other calls from other stations are rejected. In this way, the call quality of voice calls can be guaranteed.

Thus, new voice clients below the handoff reservation threshold are automatically allowed to be associated. However, active calls greater than 6, which have not been previously active, are not allowed to come into the network.

It should be appreciated that since these thresholds are programmable, a network administrator can enforce a wide variety of network load balancing techniques.

Figure 7:
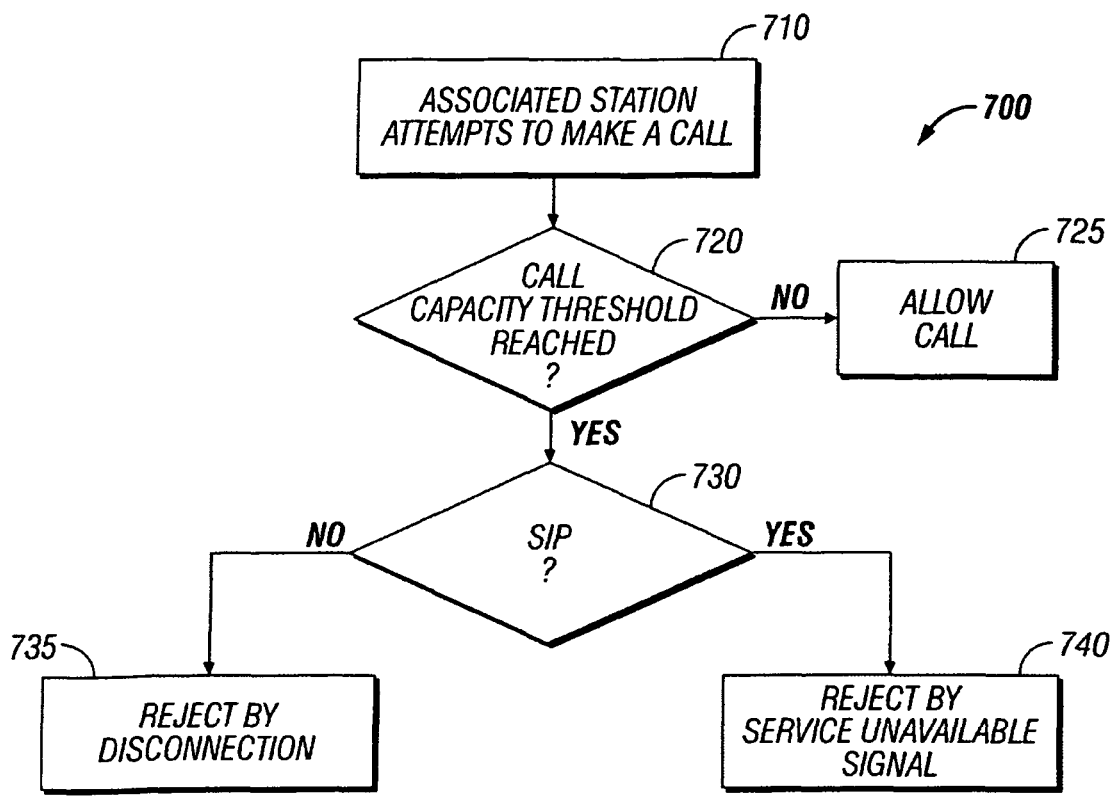
FIG. 7 is another embodiment of a method of operation for the network switch of FIG. 2 to implement call admission control.

For example, in another embodiment, with reference now to FIG. 7, an exemplary embodiment of a method of operation 700 for call control implemented by the network switch 120 of FIG. 2 is described. In this embodiment, a wireless station 150 already previously associated with an access point 130 attempts to make a call (block 710). The network switch 120 determines whether a call capacity threshold corresponding to a pre-determined amount of voice traffic has been met (block 720), and if not, the call is allowed (block 725).

However, if the call capacity threshold has been reached the call will be rejected. The method of rejection will depend upon the type of protocol being utilized. At block 730, the network switch 120 determines what type of protocol is being utilized. If a session initiation protocol (SIP) signal is being utilized then the call is rejected by sending a service unavailable signal (block 740) to the wireless station 150. In particular this may be a SIP 503 "service unavailable" (i.e., a busy tone) signal.

On the other hand, if a session initiation protocol (SIP) is not being utilized then the call is rejected by a disconnection signal. For example, this may be a WiFi disconnection signal in accordance with the IEEE 802.11 Standard.

Figure 8:
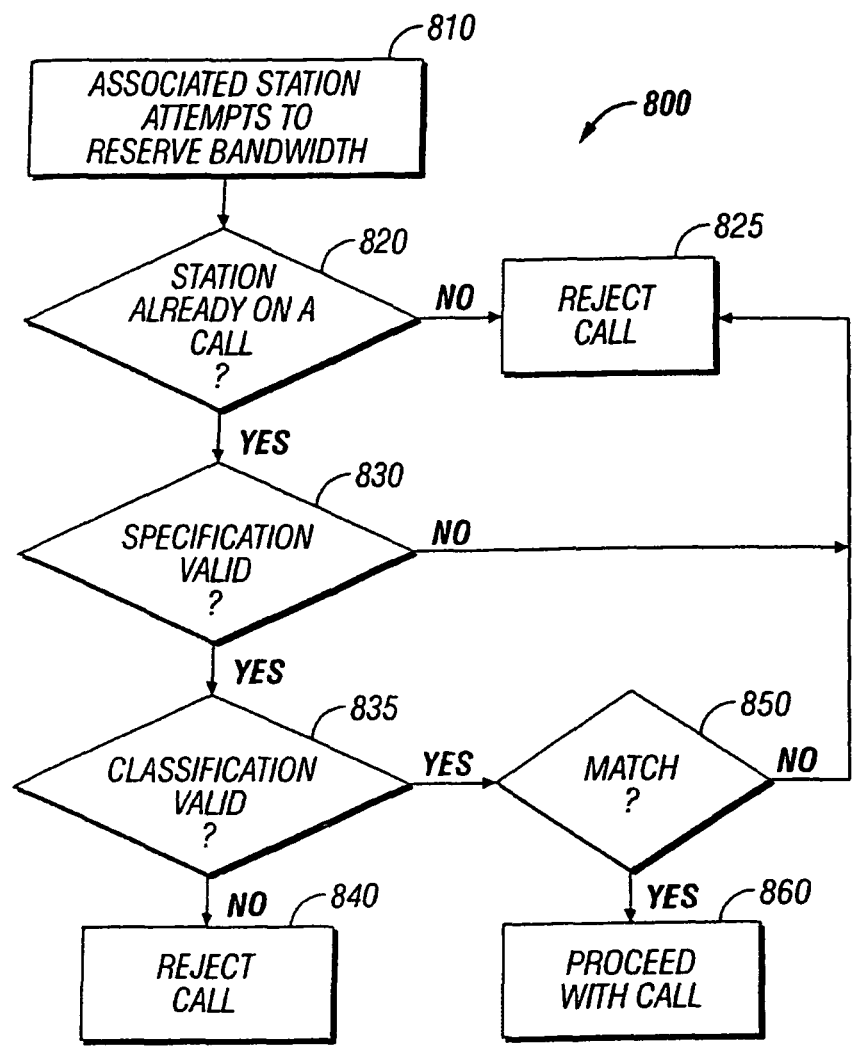
FIG. 8 is an exemplary embodiment of a method of operation for the network switch for FIG. 2 in order to regulate attempts to reserve bandwidth by a wireless station.

Referring now to FIG. 8, FIG. 8 is an exemplary embodiment of a method of operation 800 for the network switch of FIG. 2 in further supporting call admission control functionality. More particularly, process 800 provides a firewall in the wireless network 110 to ensure that a mobile station is already on call and that voice traffic specifications and classifications actually match a voice call session in order to provide security against misbehaving mobile stations and potential attacks.

At block 810, an associated mobile station 150 may attempt to reserve bandwidth through an AP 130 to network switch 120. The network switch 120 will then determine whether the station is already on a call (block 820). If not, the call is rejected (block 825). However, if the wireless station 150 was already on a call, then, at block 830, the network switch 120 determines whether the traffic specification of the voice call is valid. This is commonly referred to as TSPEC (traffic specification) in which the wireless station specifies how much bandwidth for the voice call it requires.

If the network switch 120 determines that the traffic specification is a valid voice call specification (i.e., it fits within an acceptable range of bandwidth typically associated with a voice call), then at decision block 835, the network switch determines whether the traffic classification is valid. This is often referred to as TCLAS (traffic classification) in which the mobile station specifies what kind of traffic should be prioritized (i.e., in this case, voice traffic).

If the traffic classification is determined not to be valid, then at block 840 the call is rejected.

However, if the traffic classification is determined to be valid, then, at decision block 850, the network switch 120 determines whether there is a proper session description protocol (SDP) match, and if so, the network switch allows the wireless station 150 to proceed with the voice call (block 860). Otherwise, the network switch 120 rejects the call (block 825).

In particular, in determining a SDP protocol match, the network switch 120 determines whether the newer unencrypted data matches the original encrypted data, utilized to set up the call, in order to determine that a voice call is really being made as opposed to other types of data traffic such as HTTP traffic.

In essence, when a wireless station 150 is attempting to reserve bandwidth for a voice call, the process 800 by determining that the station is already on a call, that the traffic specification and classification are valid and that the present and original session description protocols match, ensures that a voice call is truly being made and guards against misbehaving wireless stations that may try to preserve bandwidth for other types of operations.

Thus, as previously described above, a variety of different call admission control processes for use within a wireless network are disclosed to efficiently manage calls from wireless stations in a wireless network, in an efficient and safe manner to guard against misbehaving devices.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
   receiving, by a first access point, a request from a mobile wireless station for a voice call;
   determining whether a call capacity threshold for voice-traffic has been met by current voice calls supported by the first access point, the current voice calls being a subset of all current active calls supported by the first access point;
   responsive at least to determining that the call capacity threshold is met, rejecting the request for the voice call;
   responsive at least to determining that the call capacity threshold is not met, granting the request for the voice call; and
   wherein the first access point comprises a hardware processor.

2. The method of claim 1, further comprising:
   determining that the all current active calls supported by the first access point has not met a pre-determined number of maximum active calls for the first access point;
   wherein granting the request for the voice call is further based on determining that the all current active calls supported by the first access point has not met the pre-determined number of maximum active calls for the first access point.

3. The method of claim 1, wherein determining whether the call capacity threshold for voice-traffic has been met comprises:
   identifying a number of the all current active calls supported by the first access point that are voice calls;
   determining whether a maximum number of voice calls for the first access point has been met by the number of voice calls.

4. The method of claim 1, wherein if the call capacity threshold has been met,
   rejecting the request for the voice call with a service unavailable signal if a session initiation protocol (SIP) signal is being utilized;
   rejecting the request for the voice call with a disconnection signal if the SIP signal is not being utilized.

5. The method of claim 1, further comprising:
   reserving bandwidth for the mobile wireless station in response to determining that a traffic specification request and a traffic classification request are valid, and a session description protocol (SDP) is properly matched.

6. The method of claim 1, further comprising:
   subsequent to rejecting the request for the voice call, granting a request for a second call received by the first access point based at least on determining that the second call is not a voice call.

7. A non-transitory computer readable storage medium comprising instructions which, when executed by one or more hardware processors, is configured to perform operations comprising:
   receiving, by a first access point, a request from a mobile wireless station for a voice call;
   determining whether a call capacity threshold for voice-traffic has been met by current voice calls supported by the first access point, the current voice calls being a subset of all current active calls supported by the first access point;
   responsive at least to determining that the call capacity threshold is met, rejecting the request for the voice call; and responsive at least to determining that the call capacity threshold is not met, granting the request for the voice call.

8. The computer readable storage medium of claim 7, wherein the operations further comprise:
determining that the all current active calls supported by the first access point has not met a pre-determined number of maximum active calls for the first access point;
wherein granting the request for the voice call is further based on determining that the all current active calls supported by the first access point has not met the pre-determined number of maximum active calls for the first access point.

9. The computer readable storage medium of claim 7, wherein determining whether the call capacity threshold for voice-traffic has been met comprises:
identifying a number of all current active calls supported by the first access point that are voice calls;
determining whether a maximum number of voice calls for the first access point has been met by the number of voice calls.

10. The computer readable storage medium of claim 7, wherein the operations further comprise:
if the call capacity threshold has been met:
rejecting the request for the voice call with a service unavailable signal if a session initiation protocol (SIP) signal is being utilized;
rejecting the request for the voice call with a disconnection signal if the SIP signal is not being utilized.

11. The computer readable storage medium of claim 7, wherein the operations further comprise:
reserving bandwidth for the mobile wireless station in response to determining that a traffic specification request and a traffic classification request are valid, and a session description protocol (SDP) is properly matched.

12. The computer readable storage medium of claim 7, further comprising:
subsequent to rejecting the request for the voice call, granting a request for a second call received by the first access point based at least on determining that the second call is not a voice call.

13. A system comprising:
a first access point comprising a hardware processor;
the system being configured to perform operations comprising:
receiving, by the first access point, a request from a mobile wireless station for a voice call;
determining whether a call capacity threshold for voice-traffic has been met by current voice calls supported by the first access point, the current voice calls being a subset of all current active calls supported by the first access point;
responsive at least to determining that the call capacity threshold is met, rejecting the request for the voice call; and
responsive at least to determining that the call capacity threshold is not met, granting the request for the voice call.

14. The system of claim 13, wherein the operations further comprise:
determining that the all current active calls supported by the first access point has not met a pre-determined number of maximum active calls for the first access point;
wherein granting the request for the voice call is further based on determining that the all current active calls supported by the first access point has not met the pre-determined number of maximum active calls for the first access point.

15. The system of claim 13, wherein determining whether the call capacity threshold for voice-traffic has been met comprises:
identifying a number of all current active calls supported by the first access point that are voice calls;
determining whether a maximum number of voice calls for the first access point has been met by the number of voice calls.

16. The system of claim 13, wherein the operations further comprise:
if the call capacity threshold has been met:
rejecting the request for the voice call with a service unavailable signal if a session initiation protocol (SIP) signal is being utilized;
rejecting the request for the voice call with a disconnection signal if the SIP signal is not being utilized.

17. The system of claim 13, wherein the operations further comprise:
reserving bandwidth for the mobile wireless station in response to determining that a traffic specification request and a traffic classification request are valid, and a session description protocol (SDP) is properly matched.

18. The system of claim 13, wherein the operations further comprise:
subsequent to rejecting the request for the voice call, granting a request for a second call received by the first access point based at least on determining that the second call is not a voice call.

* * * * *